March 19, 1935.  H. G. OTT  1,994,483
OPTICAL ARTICLE AND METHOD OF MAKING SAME
Filed Oct. 13, 1932
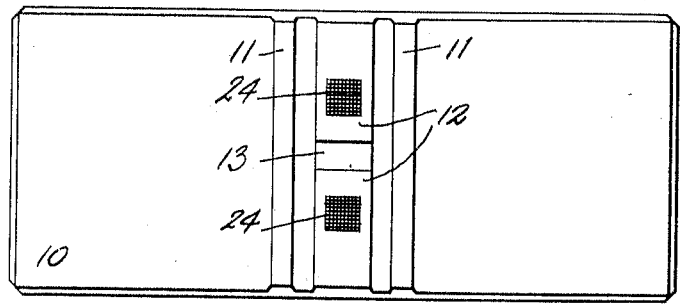
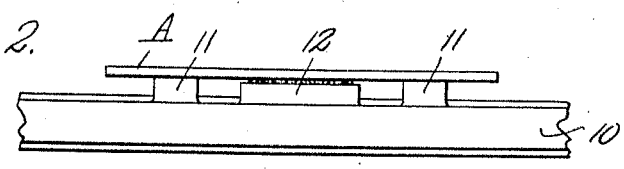
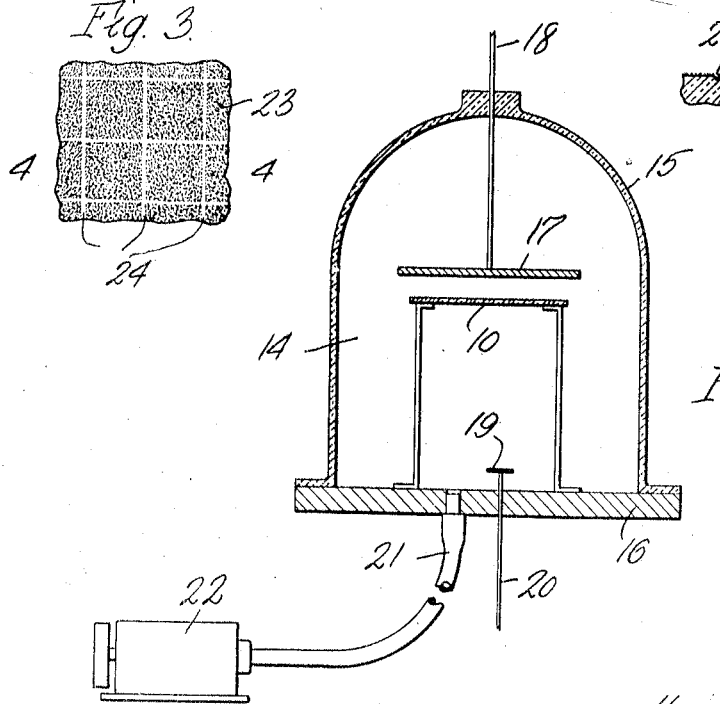
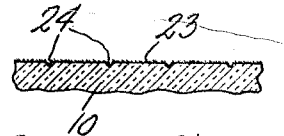
INVENTOR.
Harry G. Ott
by Parker, Crosbrook & Kermer
ATTORNEYS Patented Mar. 19, 1935

1,994,483

UNITED STATES PATENT OFFICE 1,994,483

OPTICAL ARTICLE AND METHOD OF MAKING SAME

Harry G. Ott, Kenmore, N. Y., assignor to Spencer Lens Company, Buffalo, N. Y.

Application October 13, 1932, Serial No. 637,613

19 Claims. (Cl. 88—40)

This invention relates to optical devices, and particularly to those utilizing transparent material, upon which reference markings may be placed. Examples of such articles are reticles and slides or counting chambers for microscopes, especially those known as hæmocytometers, which have reference lines which define a pattern or zones or areas on a face thereof. Heretofore it has been difficult to rule uncoated glass or other transparent objects with lines as fine as are frequently required, and always have the lines distinctly visible under a microscope. With the best of such lines, as heretofore made, it has been necessary to diaphragm the condenser, or stop it down, to such an extent that the effectiveness of the instrument is seriously impaired for observation of details, such as of blood dilutions, before the reference lines could be made clearly and distinctly visible.

An object of this invention is to provide an optical device utilizing a transparent body with very fine reference lines thereon that will be easily and distinctly visible when viewed in the optical system of the optical device, without diaphragming the condenser or stopping it down, or otherwise interfering with the maximum possible visibility of the image in said system of the optical device.

Another object of the invention is to provide an improved method for placing reference coatings and lines on transparent optical articles for use in optical systems.

Another object of the invention is to provide a transparent optical article with a semi-transparent coating which will be fixed thereto sufficiently to resist cleansing actions that may be performed on the body.

Still another object of the invention is to provide an improved optical article, such as a counting chamber, slide or a hæmocytometer, which will have on a face thereof lines of maximum visibility and distinctness, and which will be relatively simple, practical, and accurate.

A further object of the invention is to provide an improved transparent optical article, and method of making the same, which will have a semi-transparent coating on a face thereof that is substantially inert to most substances that may be applied to the coated article.

Various other objects and advantages will be apparent from the following description of an embodiment of the invention, and the novel features will be particularly pointed out hereinafter in connection with the appended claims.

In the accompanying drawing:

Fig. 1 is a plan of an optical article, such as a counting slide or hæmocytometer, constructed in accordance with this invention;

Fig. 2 is a side elevation of the same, but with a cover glass applied thereto, and a solution in position between the cover glass and the ruled surface of the slide;

Fig. 3 is a plan of a portion of the ruled face of such a slide, on a highly magnified scale;

Fig. 4 is a sectional elevation of the same with the section taken approximately along the line 4—4 of Fig. 3; and Fig. 5 is a sectional elevation of a simple conventional apparatus to illustrate one manner in which a metal may be deposited on a glass plate as a semi-transparent layer by the sputtering of the metal from a cathode in a glow discharge device.

In accordance with this invention, the optical device which has been selected to show an embodiment or example of the invention, is a microscope slide or hæmocytometer comprising a plate 10 of glass having spaced, elevated ribs 11 upon a face thereof. The ribs 11 serve to support the usual cover glass A. Between these ribs 11 is a broad, raised section 12 that is of slightly less height than the ribs 11. The upper or end face of this elevated section 12 is preferably given its final finish such as by fine grinding or polishing, and then the lines subdividing a selected portion of this face into selected areas are formed or placed thereon. In the particular example illustrated, a groove 13 subdivides the face 12 into two sections, each of which has a subdivided face area but it will be understood that this groove 13 is not essential and that one or any number of subdivided areas may be provided on a slide.

According to one very satisfactory method of forming the reference lines upon such a plate or slide, the plate 10 is supported in a suitable manner inside a sealed chamber 14, Fig. 5, such as under a bell jar 15 which is removably sealed to a base 16. A cathode 17, which may conveniently be in the form of a metal plate 17, is supported in the chamber 14 by a conductor 18 which passes outwardly through a sealed passage in the bell jar 15, the cathode or plate 17 being disposed just above the plate 10. An electrode 19 is provided in the lower part of the chamber 14 at the opposite side of the plate 10 from the plate 17, and this electrode is included in an electric circuit by means of a conductor 20 which passes out through the base 16.

A conduit 21 opens into the chamber 14 through the base 16 and this, in turn, is connected to a suitable vacuum creating device 22, such as a vacuum pump or barometric condenser. The chamber 14, the cathode 17, and the electrode 19 form a glow discharge tube or device so that when a suitable electric current is applied to the conductors 18 and 20 while there is a partial vacuum in the chamber 14, there will be a glow discharge between the electrode 19 and the cathode 17. During this glow discharge, there will be a sputtering or discharge of fine or colloidal particles of the metal from the cathode 17, and the metallic particles so thrown off by the cathode 17 will be deposited upon the plate 10 in the form of a layer or coating 23, the density of which may be regulated to some extent in a manner well known in the art, such as by duration of the operation or by regulation of the current.

The coating 23 applied in this manner is semi-transparent because a thin coating can be obtained owing to the fact that the metallic particles so deposited upon the plate are colloidal in nature and are little more than molecules of the metal which have been thrown off by the cathode and caught by the plate.

After the plate 10 has been coated in this manner, it is removed and subjected to a ruling or cutting operation by which the coating 23 is removed in narrow strips forming lines 24, as shown in Figs. 3 and 4. The lines thus formed on the plate may be made extremely fine or narrow, due to the thinness of the coating or layer of the metal. While this metallic coating is quite adherent to the plate of glass, it is important that the coating be fixed to the plate as firmly as possible, so that in subsequent cleaning operations to which the plate may be subjected after use, none of the coating will be removed and cause obliteration or destruction of the fine lines.

Any suitable manner of fixing such a coating to the plate may be employed, but one very satisfactory method of fixing the coating is by a process known as "burning in" which consists of heating the coated plate to a suitable temperature which is usually less than the softening or fusing point of either the coating or the plate. For example, when the plate is of glass and the metal is platinum, I have found that heating the coated plate to a temperature of approximately 900° F. is sufficient to fix the coating to the glass very satisfactorily.

During the heating of the coated plate to this high temperature to burn or fix the coating to the plate, the nature of the exact change which occurs is not definitely known, but is believed to be due to a greater physical attraction between the molecules of metal and the molecules of glass which have increased their amplitude of vibration during the increase in temperature. After the coated plate has been heated to the desired extent to fix the coating to the plate, the article is allowed to cool and is then ready for use. During use, such an article may be rubbed and cleansed freely without danger of any material removal of the coating.

The lines 24, which are merely narrow strips of higher transparency than the coated sections, may be very fine lines and yet be very clearly and distinctly visible, and I have found that they are distinctly visible under all conditions of use under a microscope. For example, it is unnecessary to diaphragm or stop down the condenser and shut out light in order to increase the visibility of such lines, and, therefore, one may very easily set the microscope to give maximum visibilty of the lines at the same time that maximum visibility of the details of the solution on the slide is obtained. When the slide is used as a hæmocytometer, it is possible to have full visibility of the lines at the same time that the details of the blood dilution are fully and clearly visible.

Any metal may be employed as the cathode, and the coating of course will be of the metal of the cathode. Usually it is preferable to use those metals which are inert to the solutions being examined, and for that purpose platinum, gold and silver are particularly valuable, yet such slides are inexpensive because of the very minute amount of metal which is deposited upon each plate or slide.

It is also possible to provide this semi-transparent coating by other means. For example, the chemical process of depositing silver or other metals on mirrors or glass plates may be adopted for this purpose. Various other means for depositing metal coatings on objects may also be employed. I may also apply an opaque substance in colloidal suspension to a transparent body, but, in such a case, the opaque substance should preferably be one which will not volatilize at the fixing temperatures, and the suspending liquid medium should be volatilizable. Under this last mentioned method, the area of the plate or transparent body to be coated is painted, sprayed or otherwise coated with this colloidal, opaque substance which is in suspension, and the suspending medium is then removed to leave the opaque substance adhering as a thin layer or coating to the transparent body.

This layer may be fixed to the plate in any suitable manner, such as by "burning in". It will be understood, however, that while the colloidal substance is opaque, it provides a semi-transparent layer or coating by reason of its colloidal form and the extent of dilution of the suspending medium. After a plate has been coated according to any of these other methods above described, the lines are formed by removing a part of the coating. This removal may be carried out either before or after the fixing of the coating to the transparent body or plate.

In forming the lines by the removal of a part of the coating, one may remove only narrow strips of coating to form fine lines free of coating that define the boundaries of reference zones on the coated areas, or one may remove coated areas to leave fine reference lines of the coating extending across the previously coated area and defining reference zones thereon. By either method of forming the lines, it is possible to obtain either lines of full transparency on a semi-transparent background, or semi-transparent lines on a fully transparent background, depending upon the uses to which the optical article is to be put. The coated and uncoated areas provide contrasting areas or zones, yet there is considerable transparency in both coated and uncoated areas which will not seriously interfere with the passage of light through this optical article.

It will be understood that the apparatus for applying the layer of metal to the plate by sputtering is shown schematically and described only briefly in order to illustrate the principle employed, and other apparatus suitable and well known for this purpose may be substituted and used within the scope of this invention. It will also be understood that while the optical device which has been illustrated and described is a microscope slide or counting chamber, such as a hæmocytometer, the invention is also applicable, in its broader aspects, to other optical devices with an optical system to erect images and utilizing reference lines on a transparent body.

It will be understood that the lines of narrow strips free of coating are relatively small or narrow and in the claims where I have referred to the lines or strips as being of microscopic size, I intend to refer to lines which are of a size that are not easily distinguished and defined when viewed under the naked eye but which become easily visible when they are closely examined or magnified to some extent.

It will be further understood that various other changes in the details which have been herein described and illustrated in order to explain the nature of the invention, may be made by those skilled in the art within the principle and scope of the invention as expressed in the appended claims.

I claim:

1. A microscope slide comprising a plate of transparent material having a semi-transparent, adherent coating upon a face thereof, with narrow, uncoated portions forming division lines crossing the coated area of said face to subdivide that area into selected zones, whereby when any zone is under magnification, said lines defining its limits will be clearly visible.

2. A microscope slide comprising a body of transparent material having a semi-transparent coating fixed to a face thereof, and divided by uncoated lines of microscopic size into selected zones delineating a predetermined pattern, whereby when any zone of said coated face is under magnification, said lines defining that zone will be clearly visible.

3. A microscope slide comprising a body of transparent material having a semi-transparent metallic coating upon a face thereof and subdivided, by lines free of said coating, into selected areas.

4. A microscope slide comprising a body of transparent material having a semi-transparent metallic coating upon, and burnt into, a face thereof and subdivided, by lines free of said coating, into selected areas.

5. A microscope slide comprising a body of transparent material having, upon a face thereof, a semi-transparent coating producing a contrasting background, and having a line-like strip free of said coating crossing said background.

6. A microscope slide comprising a body of transparent material having upon portions of a face thereof, a semi-transparent coating, which with the uncoated portions of the face provides a plurality of contrasting zones with one group of zones separated by narrow lines of the other contrasting zones.

7. A microscope slide comprising a body of transparent material having, upon a portion of a face thereof, a semi-transparent coating of a mixture of an opaque substance in colloidal form and a volatile suspension medium for said substance said coating being divided by uncoated strips into specified zones.

8. A microscope slide comprising a body of transparent material having, upon a portion of a face thereof, a burnt in semi-transparent coating of a mixture of an opaque substance in colloidal form which will not volatilize at burning in temperatures, and a volatile suspension medium for said substance, said coating being divided by uncoated strips into specified zones.

9. A microscope slide comprising a body of transparent material having, upon a portion of a face thereof, a semi-transparent coating of deposited metal, fixed to said face to prevent substantial removal of any part thereof by cleansing operations, and subdivided by strips free of said coating into selected areas.

10. The process of preparing a microscope slide, which comprises the steps of applying to a portion of the face of the body of transparent material, a semi-transparent coating of an opaque colloidal substance, and fixing said coating to said face to resist cleansing operations on said body, and removing portions of said coating to delineate specified areas.

11. The process of preparing a microscope slide which comprises the steps of depositing, upon a face of a body of transparent material, a semi-transparent coating of an opaque substance by sputtering from a cathode of that substance, and then removing portions of said coating to provide areas of one degree of transparency defined by areas of a different degree of transparency.

12. The process of preparing a microscope slide which comprises the steps of placing a body of transparent material in the field of sputtering from a cathode of an opaque substance in a glow discharge device, until a semi-transparent coating of the substance of that cathode is deposited on a face of said body, and then removing the coating in selected areas to provide an area of one degree of transparency defined by zones of another degree of transparency.

13. The process of preparing a microscope slide which comprises the steps of depositing, upon a face of a body of transparent material, a semi-transparent coating of metal by sputtering from a cathode of that metal, removing strip like portions of said coating to provide areas of one degree of transparency defined by areas of a different degree of transparency and burning in said coating.

14. The process of preparing a microscope slide which comprises the steps of placing a body of transparent material in the field of sputtering from a metal cathode in a glow discharge device, until a semi-transparent coating of the metal of that cathode is deposited on a face of said body, burning in said coating, and removing portions of said coating to provide sharply defined areas of different degrees of transparency.

15. The process of preparing a microscope slide which comprises the steps of applying to a face of a transparent body, a semi-transparent coating, and removing part of said coating to provide lines of contrasting transparency crossing said face in the portion of said face to which the coating was applied.

16. The process of preparing a microscope slide which comprises the steps of applying to a face of a transparent body a semi-transparent coating, removing part of said coating to provide lines of contrasting transparency crossing said face in the portion of said face to which the coating was applied, and fixing said coating to said body by the application of heat to said coated body.

17. The process of making a counting slide for microscopes, which comprises applying to a face of a glass plate, a semi-transparent metallic coating, and heating said coated plate to a temperature of approximately 900° F. to fix the coating to the plate, and removing portions of said coating to provide lines of relatively narrow width, defining zones of different degrees of transparency.

18. A device for counting visible bodies suspended in a fluid and magnified in an optical system, which comprises a plate of transparent material having upon the specimen-supporting face thereof, a semi-transparent, adherent coating of an opaque substance, having zones thereof sharply defined by lines of a different degree of transparency.

19. The process of preparing a counting device for microscopes which comprises the steps of applying to a face of a transparent body, a semi-transparent coating of a substance having light refractive properties different than said body and then removing part of said coating in lines to provide relatively fine lines of contrasting transparency crossing said face in a portion of said face to which the coating was applied, whereby the coated part of said face will be subdivided by lines of a different degree of transparency that define counting zones.

HARRY G. OTT.